United States Patent [19]

Snyder

[11] Patent Number: 5,087,276
[45] Date of Patent: Feb. 11, 1992

[54] METHOD AND APPARATUS FOR USER SIZABLE FURNACE FILTER AND HOLDER

[75] Inventor: Michael R. Snyder, Leawood, Kans.

[73] Assignee: Rolox Ltd., Kansas City, Mo.

[21] Appl. No.: 641,284

[22] Filed: Jan. 15, 1991

[51] Int. Cl.⁵ .................. B01D 46/10; B01D 53/04
[52] U.S. Cl. .................................. 55/496; 55/316; 55/DIG. 31
[58] Field of Search .................. 55/97, 316, 422, 475, 55/483, 485, 496, 320, DIG. 31

[56] References Cited

U.S. PATENT DOCUMENTS

| | | | |
|---|---|---|---|
| 2,175,903 | 10/1939 | Lichtman | 55/496 X |
| 2,852,094 | 9/1958 | Sawle | 55/496 X |
| 3,675,402 | 7/1972 | Weed | 55/496 |
| 4,141,703 | 2/1979 | Mulchi | 55/316 |

Primary Examiner—Charles Hart

[57] ABSTRACT

A furnace filter and holder are presented which are capable of being adapted to any one of a number of furnace sizes as selected by the user. The holder and filter and a filter support are capable of being sized to user selected dimensions through the use of templates provided on the carton in which the components are packaged.

12 Claims, 2 Drawing Sheets

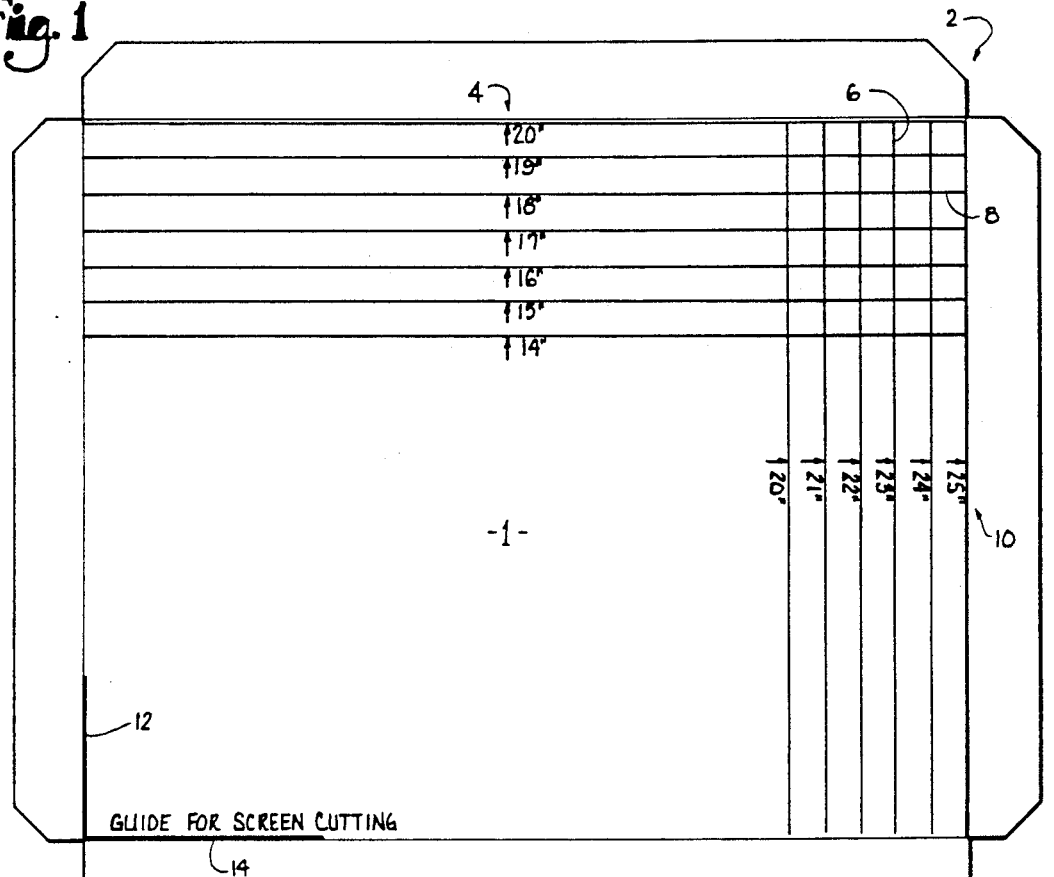
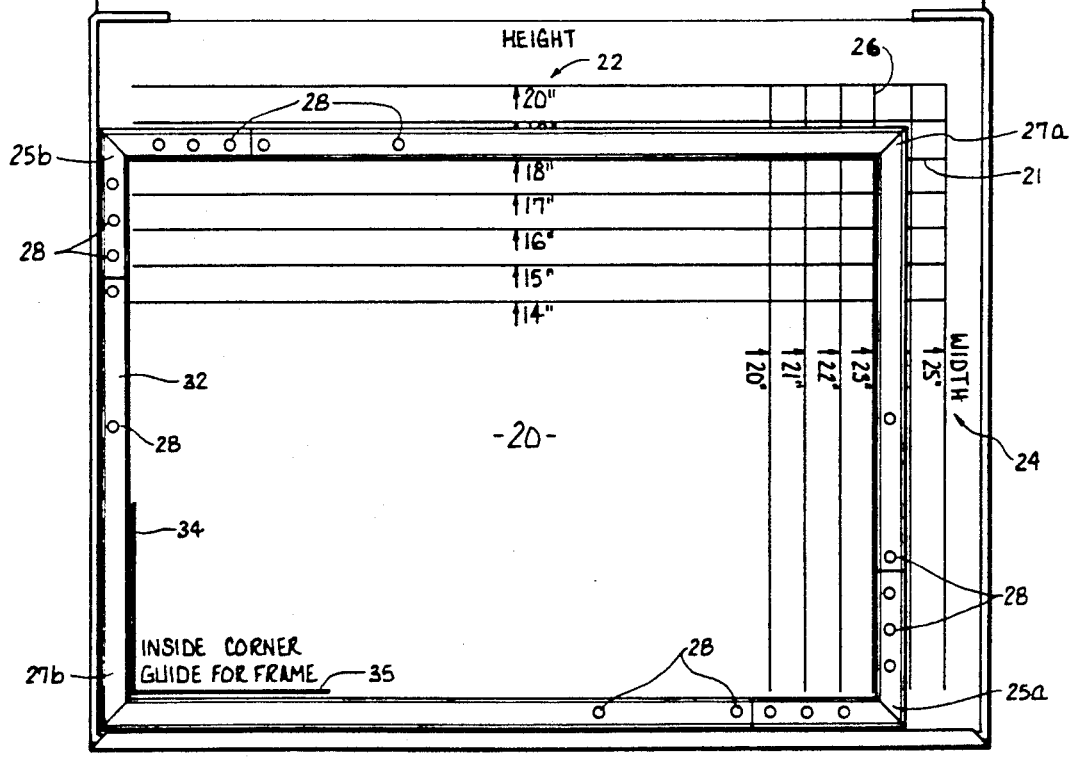

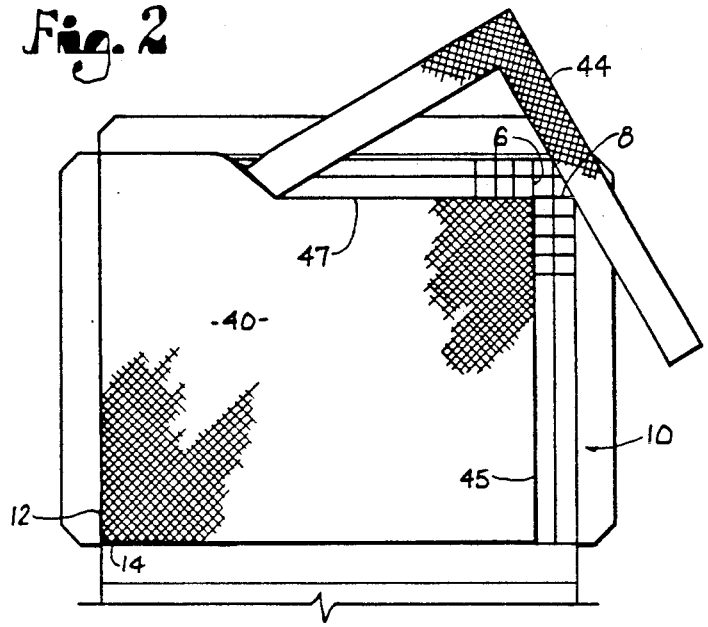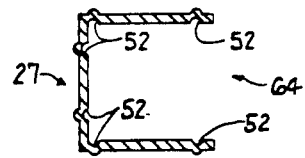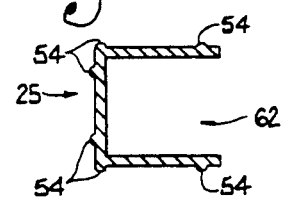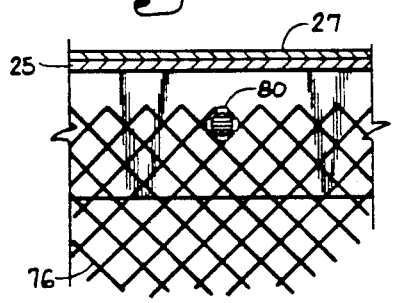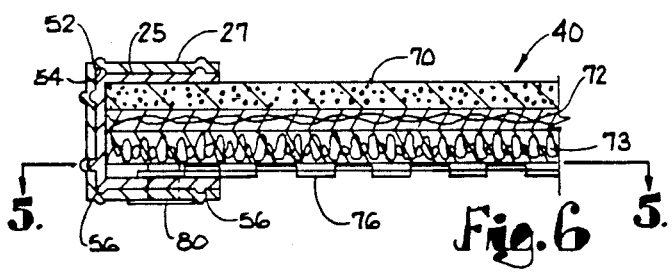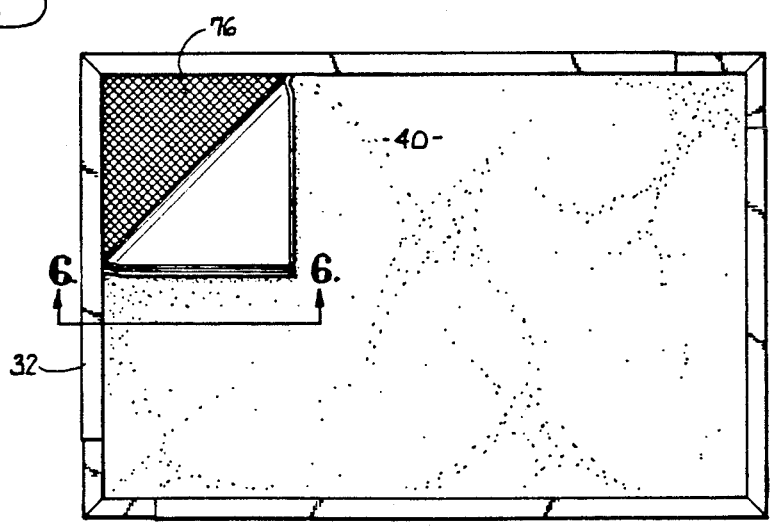

METHOD AND APPARATUS FOR USER SIZABLE FURNACE FILTER AND HOLDER

BACKGROUND OF THE INVENTION

This invention relates to filters for heating and cooling systems and more particularly, to a novel method and accompanying apparatus for providing user selectable sizing of filter holders and filters.

In air supply systems, inclusive of home and industry heating and cooling systems, the filtration of the air prior to temperature adjustment has become of increasing importance. The use of modern construction methods which provide a tight seal of homes to achieve energy efficiency has resulted in less air flow from outside the home and increased recirculation of household air. This results in the introduction of airborne particles from the living quarters which must be eliminated prior to recirculation of the air. In the case of commercial buildings, the use of sealed windows and the emphasis on energy efficiency requires that heated or cooled air be recirculated and that a minimum of outside air be introduced so energy efficiency is maintained. Thus the airborne contaminants introduced from the building inhabitants must be cleaned from the air prior to recirculation. This increased dependence upon air filtration systems in modern dwellings has resulted in greater importance being placed on air filtration quality and an increase in the number of required filter changes per month.

With conventional filters which are disposable, a supply of replacement filters must be maintained so the filter may be renewed when exhausted. The disposable filter medium, typically fiberglass, is a relatively inefficient screen for dust, pollen and similar particles and captures only a relatively small percentage of such contaminants.

Another complication with the conventional disposable filter is that the spun fiberglass construction is non-biodegradable. Therefore, throwaway filters represent not only increased costs over the life of the furnace but increased landfill waste.

Therefore, it is a general object of this invention to provide a method and apparatus for providing a highly efficient, user size adjustable filter for forced air heating and cooling units.

Another object of this invention is to provide an adjustable filter for use in forced air heating and cooling units which is reusable.

Still another object of this invention is to provide a method and apparatus which enables the user to adjust the size of a filter holder and medium to the specific dimensions of a particular air conditioner or furnace unit.

Yet another object is to provide a universal filter assembly which incorporates a highly efficient, electrostatic, filter medium and is adjustable in size so as to fit a wide range of standard furnace sizes.

The above and further objects and novel features of the invention will more fully appear in the following description when the same is read in conjunction with the accompanying drawings.

Description of the Drawings

FIG. 1 is a plan view of the invention container or carton shown open in order to illustrate the templates for sizing of the filter medium and the filter holder, and illustrating a filter holder in position on the filter holder template;

FIG. 2 is a partial plan view similar to FIG. 1 showing a filter in position on the filter template and illustrating a portion of the filter trimmed to size;

FIG. 3 is a transverse cross-sectional view of the outer right angle frame member showing the channel for receiving the filter and filter support;

FIG. 4 is a traverse cross-sectional view of the inner right angle frame member showing the channel for receiving the filter and filter support;

FIG. 5 is a cross-sectional view taken along line 5—5 of FIG. 6 and illustrating the placement of the filter support within the holder and showing the holder locking pin;

FIG. 6 is a partial transverse cross-sectional view of the holder taken along line 6—6 of FIG. 7 with the filter support and filter in place within the channel;

FIG. 7 is a plan view of the assembled holder, from the reverse side of that illustrated in FIG. 1, and with the filter shown being inserted into the holder channel and over the filter support.

DESCRIPTION OF THE PREFERRED EMBODIMENT

Reference is made to FIG. 1 showing a plan view of the apparatus container or carton 2 having templates 1, 20 printed on the inside surfaces of the top and bottom panels of the carton 2 which are used for sizing of filter 40 (FIG. 2) and sizing of the frame 32. Filter sizing template 1 presents filter width measurement scale 10 and filter height measurement scale 4 which permit the user to conveniently determine the height and width to which the filter 40 should be adapted for use in a particular air distribution system.

In sizing the width of filter 40 an edge of filter 40 is placed against filter width baseline 12 and the proper width is determined from filter width measurement scale 10. To adapt the filter height to the desired size, the edge of filter 40 which is 90° from the edge applied against filter width baseline 12, is applied to filter height baseline 14. The desired filter height is then determined from filter height measurement scale 4.

Application of the above procedure to the sizing of a filter 18 inches in height and 23 inches in width is achieved in the following manner. Taking FIG. 1 in conjunction with FIG. 2 it may be seen that the bottom left-hand corner of filter 40 (FIG. 2) is placed simultaneously against filter width baseline 12 and filter height baseline 14. The desired width is then determined on filter width measurement scale 10 by locating the 23 inch filter width indicator 6. The filter is then trimmed to a nominal width of 23 inches along 23 inch filter indicator line 6 with scissors or a sharp knife. Alternatively, if an expandable filter media is being utilized, the filter 40 is stretched to uniformly touch the 23 inch filter width indicator 6 along the entirety of the filter edge 45 (FIG. 2).

The height of filter 40 (FIG. 2) is then adjusted by locating the desired height on filter height measurement scale 4. In the present example, 18-inch filter height indicator 8 is located and the height of filter 40 is then trimmed to a nominal 18-inch height by cutting along 18-inch filter height indicator 8 with scissors or a sharp knife. If expandable filter media is used, edge 47 of filter 40 is stretched to uniformly touch filter height indicator 8.

The measurements on scales 4, 10 of filter sizing template 1 and the measurements on scales 22, 24 of frame sizing template 20 represent nominal measurements associated with the final exterior measurements of the properly sized frame 32. Consequently, 18-inch filter height indicator 8 is an actual distance of slightly less than 17½ inches from filter height baseline 14. In corresponding fashion, the actual measurement of 18-inch frame height indicator 21 from frame bottom interior edge guide 35 is slightly less than 16 inches as the measurement scale 22 includes the additional two inches of height provided by the frame 32. This difference between the nominal measurements presented on templates 1, 20 and the actual measured distances on scales 4, 10, 22 and 24 is due to the practice of denominating filter size measurements by the exterior measurements of the filter frame rather than the actual dimensions of the filter.

Therefore, the measurement scales 4, 10, 22 and 24 present the standard nominal measurements of the overall outer dimensions of the desired standard size. This provides the user with a convenient consistent means of selecting the desired filter size on the template and eliminates user confusion which might be presented by inclusion of the actual distances.

Reference is again made to FIG. 1 showing a plan view of frame 32 and sizing template 20. The invention presents the user with an adjustable frame 32 which is composed of four right angle members 25a, 25b and 27a, 27b each having two legs. Two of the right angle members 25a, 25b are of slightly reduced size so they may fit within the leg channels 64 (FIG. 3) of the larger right angle members 27a, 27b in a telescoping fashion. Thus the pairs of right angle members 25a and 25b or 27a and 27b which form the opposite angles of the rectangular frame 32, have legs which are slidably engageable with the legs of their adjacent right angle members. In this fashion frame 32 may be independently adjusted along each side to achieve the proper sizing of frame 32. After the proper frame size is determined through use of frame height measurement scale 22 and frame width measurement scale 24, keeper pins 80 (FIG. 6) are inserted into frame locking aperture 28 (FIG. 1) to maintain the sized frame 32 at the selected dimension.

Application of the above procedure to the adaption or sizing of frame 32 to a filter having nominal measurements of 18 inches in height and 23 inches in width would be achieved in the following manner. Referring to FIG. 1, the legs of right angle members 25a, 25b have been slidably engaged within the legs of right angle members 27a, 27b to form rectangular frame 32. Frame 32 is then placed upon frame sizing template 20 with the bottom left-hand corner of frame 32 placed such that frame side interior edge guide 34 and frame bottom interior edge guide 35 may be viewed at a position just inside of right angle frame member 27b. The desired 23-inch frame width is then selected from frame width measurement scale 24 as represented by 23-inch frame width indicator 26. The width of frame 32 is then lengthened or shortened by pulling or pushing right angle members 27a and 25a to achieve the desired frame width displayed on frame width measurement scale 24. In corresponding fashion the height of frame 32 is sized or adjusted by locating the desired 18-inch frame height indicator 21 on frame height measurement scale 22 followed by lengthening or shortening by pulling or pushing right angle members 25b and 27a of frame 32 to adjust the height to the desired measurement.

Referring now to FIG. 2, filter 40 is illustrated in the process of being adapted to a particular dimension. Filter 40 is in place on filter sizing template 1 contained in apparatus container 2. The remainder of apparatus container 2 as shown in FIG. 1 has been eliminated for purposes of clarity. In FIG. 2 the lower left-hand corner of filter 40 has been placed against filter width baseline 12 and filter height baseline 14. The desired nominal 23-inch width 6 has been selected from filter width measurement scale 10 and scissors or a sharp knife have been used to trim away the excess material 44 from filter width edge 45 resting along 23-inch filter width indicator 6. In corresponding fashion the desired nominal 18-inch filter height has been located as represented by 18-inch filter height indicator 8. The excess filter material 44 has partially been trimmed from filter height edge 47.

Referring now to FIG. 3 in conjunction with FIG. 4, transverse cross-sectional views of inner right angle frame members 25a, 25b (FIG. 4) and outer right angle frame members 27a, 27b (FIG. 3) are illustrated. As shown in FIG. 6 inner members 25a, 25b are engageable within outer members 27a, 27b. The frame members 25a, 25b and 27a, 27b are held in slideable telescopic interrelationship by grooves 52 in outer frame member 27a, 27b which are engageable with corresponding ridges 54 of inner frame members 25a, 25b when inner frame member 25a or 25b is introduced into outer frame member channel 64. The grooves 52 and ridges 54 interlock as shown at 56 in FIG. 6 to provide a secure relationship between frame members 25a, 25b and 27a, 27b and to guide slideable movement between the frame members.

Referring now to FIG. 6, a partial transverse cross-sectional view taken along line 6—6 of FIG. 7 shows the interrelationship of the components of the filter assembly. In FIG. 6 a multiple layer filter medium is illustrated as an alternative to a simple spun glass type dust filter. An activated carbon layer 73 may be sandwiched between the filter element 70, 72 and a filter support grid 76. The filter element comprises a foam filter support backing 70 adhered to a layer of polyester mesh 72 which provides an electrostatically negative filtration medium. The foam support backing 70 is included to add rigidity and memory to the polyester material and to serve to trap dust and larger particles upstream from the polyester mesh 72.

As previously discussed the inner frame members 25 are engageable within outer frame members 27 to present channels 62, 64 (FIG. 3 and FIG. 4) into which the filter 40 may be inserted. In FIG. 6 the filter support grid 76 has been included to offer additional support to the filter 40 and to give added strength to the frame 32. Also in FIG. 6, the interlock 56 of ridges 54 of inner frame members 25a, 25b by grooves 52 of outer frame member 27a, 27b is illustrated. When inner members 25a, 25b are engaged with outer members 27a, 27b, the channel for insertion of filter 40 is partially composed solely of channel 64 where the outer right angle frame member 27a, 27b does not contact inner right angle frame member 25a, 25b. The channel is also made up solely of channel 62 where inner right angle frame member 25a, 25b has been inserted into outer frame member 27a, 27b and has overlapped channel 64 of frame member 27a, 27b. The overlapping does not present obstruction to channel space 62, 64 as the flexibility of filter 40 permits the filter 40 to conform to the slight variation in channel depth which occurs at the point of channel overlap between inner frame members 25a, 25b and outer frame members 27a, 27b.

Referring now to FIG. 5 the relationship of the support 76 within the channels 62, 64 is illustrated. The support 76 is affixed within channels 62, 64 by keeper pins 80 which are inserted through apertures 28 (FIG. 1) in frame members 25a, 25b, 27a, and 27b. Support 76 not only serves to lend horizontal support to filter 40, but also serves to strengthen the rigidity of frame 32.

As stated earlier keeper pin 80 serves to fix right angle frame members 25a, 25b, 27a, and 27b in position once frame 32 has been adjusted to the desired size. This is accomplished by the insertion of keeper pins 80 through apertures 28 variously spaced along right angle frame members 25a, 25b, 27a, and 27b. When the right angle frame members have been adjusted to the proper dimensions as selected from template 20, apertures 28 in both of the slidably engaged frame members 25b and 27a, or 25a and 27a, or 25a and 27b, or 25b and 27b come into registration. The keeper pin 80 is then inserted through registered frame locking apertures 28. A keeper pin 80 is inserted on each side of frame 32 to lock that side at the selected length. The keeper pin thereby engages both of the engaged right angle frame members and also engages, and retains in position, support 76.

Referring now to FIG. 7 the obverse side, with respect to FIG. 1, of the assembled frame and filter and support are illustrated. The filter 40 has been partially inserted into frame 32 leaving support 76 partially exposed. Filter 40, after being trimmed to the proper size through the use of template 1, is inserted in filter holder 32 by tucking the edges of the trimmed filter 40 into channel 62, 64 of right angle frame members 25a, 25b, 27a, and 27b. As may be observed in FIG. 6 the edge of filter 40, after being sized on template 1, fits into the edge of channel 62, 64 and is supported support 76.

This ability to insert or remove filter 40 from frame 32 by insertion into channel 62, 64 is of particular importance as it allows filter 40 to be easily removed from frame 32 for cleaning followed by subsequent replacement into frame 32. In this manner the objective of a easily cleanable replaceable filter is accomplished in the present invention thus avoiding the need for continuous purchase and replacement of filters.

Having thus described the invention, what is claimed as new and desired to be secured by Letters Patent is:

1. A furnace filter system comprising:
   a sizable filter;
   an adjustable filter holder;
   a first template for user sizing said filter, said template presenting a guide to said user for adjusting said filter to a user selectable size; and
   a second template for user sizing said filter holder, said second template presenting a guide to said user for conforming said holder to receive said sized filter.

2. The apparatus as claimed in claim 1 further comprising a support member whereby said filter is maintained in a flat and upright position.

3. The apparatus as claimed in claim 1 wherein a packaging container comprises said first template and said second template.

4. The apparatus as claimed in claim 1 wherein said holder further comprises at least two frame members in moveable relationship to size said holder to correspond with said user selected size of said filter, and means for locking said frame members in a selected relationship.

5. The apparatus as claimed in claim 1 wherein said adjusting includes means for trimming said filter to the selected size.

6. The apparatus as claimed in claim 4 wherein said means for locking comprises a plurality of registrable voids in said frame members through which a keeper pin is inserted to maintain said frame members in the selected relationship.

7. The apparatus as claimed in claim 4 wherein said means for locking comprises a frictional fit between said frame members.

8. A method of sizing a filter and filter holder to a user selected size comprising the steps of:
   applying a filter to a first template;
   adjusting said filter to a user selected dimension;
   applying a filter holder to a second template;
   adjusting said holder to a dimension appropriate to said user selected dimension of said filter; and
   inserting said filter into said holder.

9. The method as claimed in claim 8 wherein said step of adjusting said filter comprises expanding said filter to said user selected dimension.

10. The method as claimed in claim 8 wherein said step of adjusting said filter comprises trimming said filter to said user selected dimension.

11. The method as claimed in claim 8 wherein said step of adjusting said holder comprises:
   adjusting a side of said holder to a user selected height; and
   adjusting a cross member of said holder to a user selected width.

12. A furnace filter system comprising:
   a sizable filter adapted to being trimmed or expanded to a user selectable dimension;
   a sizable filter support adapted to being trimmed to a user selectable dimension;
   an adjustable holder for receiving said filter and said filter support comprising at least two frame members in moveable relationship to adjust said holder to a user selectable dimension to correspond with said user selected size of said filter and said filter support;
   means for locking said frame members in said relationship; and
   a packaging container comprising a first template and a second template, said first template presenting a guide to said user for adjusting said filter and said filter support to a user selectable size and second template presenting a guide to said user for conforming said holder to a dimension to correspond with said user selected size of said filter and said filter support.

* * * * *